US011792048B2

(12) United States Patent
Park

(10) Patent No.: US 11,792,048 B2
(45) Date of Patent: Oct. 17, 2023

(54) APPARATUS AND METHOD FOR TRANSMITTING AND RECEIVING UPLINK CHANNEL

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 187 days.

(21) Appl. No.: 17/382,812

(22) Filed: Jul. 22, 2021

(65) Prior Publication Data

US 2022/0029859 A1 Jan. 27, 2022

(30) Foreign Application Priority Data

Jul. 23, 2020 (KR) .................. 10-2020-0091447
Jun. 28, 2021 (KR) .................. 10-2021-0083600

(51) Int. Cl.
*H04L 25/02* (2006.01)
*H04L 1/08* (2006.01)
*H04L 5/00* (2006.01)
*H04W 72/23* (2023.01)

(52) U.S. Cl.
CPC ............ *H04L 25/0202* (2013.01); *H04L 1/08* (2013.01); *H04L 5/0053* (2013.01); *H04W 72/23* (2023.01)

(58) Field of Classification Search
CPC ..... H04L 25/0202; H04L 1/08; H04L 5/0053; H04L 25/0204; H04W 72/23
See application file for complete search history.

(56) References Cited

U.S. PATENT DOCUMENTS

2017/0302352 A1\* 10/2017 Islam ................... H04W 72/21
2021/0226748 A1   7/2021 Frenne et al.
2022/0303077 A1   9/2022 Frenne et al.

FOREIGN PATENT DOCUMENTS

WO   2014/110757 A1   7/2014
WO   2019/068739 A1   4/2019

OTHER PUBLICATIONS

Qualcomm Incorporated, "Considerations for Coverage Recovery of RedCap Devices", R1-2004495, 3GPP TSG-RAN WG1 Meeting #101, e-Meeting, May 25-Jun. 5, 2020.
CATT, "Discussion on the method for coverage enhancement", R1-2003651, 3GPP TSG RAN WG1 #101, e-Meeting, May 25-Jun. 5, 2020.
Renesas Mobile Europe Ltd, "PDSCH/PUSCH coverage improvements for low-cost MTC", R1-131370, 3GPP TSG RAN WG1 Meeting #72bis, Chicago, USA, Apr. 15-19, 2013.
Samsung, "Continuous precoding of NR DMRS in time domain", R1-1720286, 3GPP TSG RAN WG1 Meeting #91, Reno, USA, Nov. 27-Dec. 1, 2017.
European Patent Office, European Search Report of corresponding EP Patent Application No. 21187294.0, dated Dec. 15, 2021.

\* cited by examiner

*Primary Examiner* — Dady Chery
(74) *Attorney, Agent, or Firm* — IP Legal Services, LLC

(57) ABSTRACT

Provided are an apparatus and method for performing an uplink (UL) channel transmission. A method of a user equipment (UE) for transmitting the UL channel includes receiving information on joint channel estimation, determining a time duration for the joint channel estimation based on the information on the joint channel estimation, and transmitting one or more UL channel within the time duration for the joint channel estimation.

15 Claims, 13 Drawing Sheets

APPARATUS AND METHOD FOR TRANSMITTING AND RECEIVING UPLINK CHANNEL

CROSS REFERENCE TO RELATED APPLICATION

This application claims priority from Korean Patent Application Nos. 10-2020-0091447, and 10-2021-0083600, filed on Jul. 23, 2020, and Jun. 28, 2021, which are hereby incorporated by reference for all purposes as if fully set forth herein.

BACKGROUND OF THE INVENTION

1. Field of the Invention

The present disclosure relates to an apparatus and method for performing an uplink (UL) channel transmission and reception in a next generation/fifth generation (5G) (will be referred to as New Radio (NR) below) radio access network.

2. Description of the Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of NR. In order to meet the requirements of the individual scenarios, it is required to design NR to have flexible frame structures, compared with LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

As part of this aspect, in order to improve the uplink coverage of the terminal in NR, there is required a design for improving the accuracy of uplink channel estimation.

SUMMARY OF THE INVENTION

In this background, the present disclosure is to provide method and apparatus for improving the accuracy of uplink channel estimation through joint channel estimation.

To solve the foregoing problem, in accordance with an embodiment, a method may be provided for a UE to perform an uplink (UL) transmission. The method may include: receiving information on joint channel estimation; determining a time duration for the joint channel estimation based on the information on the joint channel estimation; and transmitting one or more UL channel within the time duration for the joint channel estimation.

In accordance with another embodiment, a method may be provided for a base station to perform an uplink (UL) reception. The method may include: transmitting information on joint channel estimation comprising information on a time duration for the joint channel estimation; and receiving one or more UL channel within the time duration for the joint channel estimation in order to maintain at least one of power consistency and phase continuity among transmissions of the one or more UL channel.

In accordance with further another embodiment, a UE may be provided for perfuming an uplink (UL) transmission. The UE may include: a receiver configured to receive information on joint channel estimation; a controller configured to determine a time duration for the joint channel estimation based on the information on the joint channel estimation; and a transmitter configured to transmit one or more UL channel within the time duration for the joint channel estimation in order to maintain at least one of power consistency and phase continuity among transmissions of the one or more UL channel.

In accordance with still another embodiment, a base station may be provided for performing an uplink (UL) reception. The base station may include: a transmitter configured to transmit information on joint channel estimation comprising information on a time duration for the joint channel estimation; and a receiver configured to receive one or more UL channel within the time duration for the joint channel estimation in order to maintain at least one of power consistency and phase continuity among transmissions of the one or more UL channel.

In this background, the present disclosure is to provide method and apparatus for improving the accuracy of uplink channel estimation through joint channel estimation.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
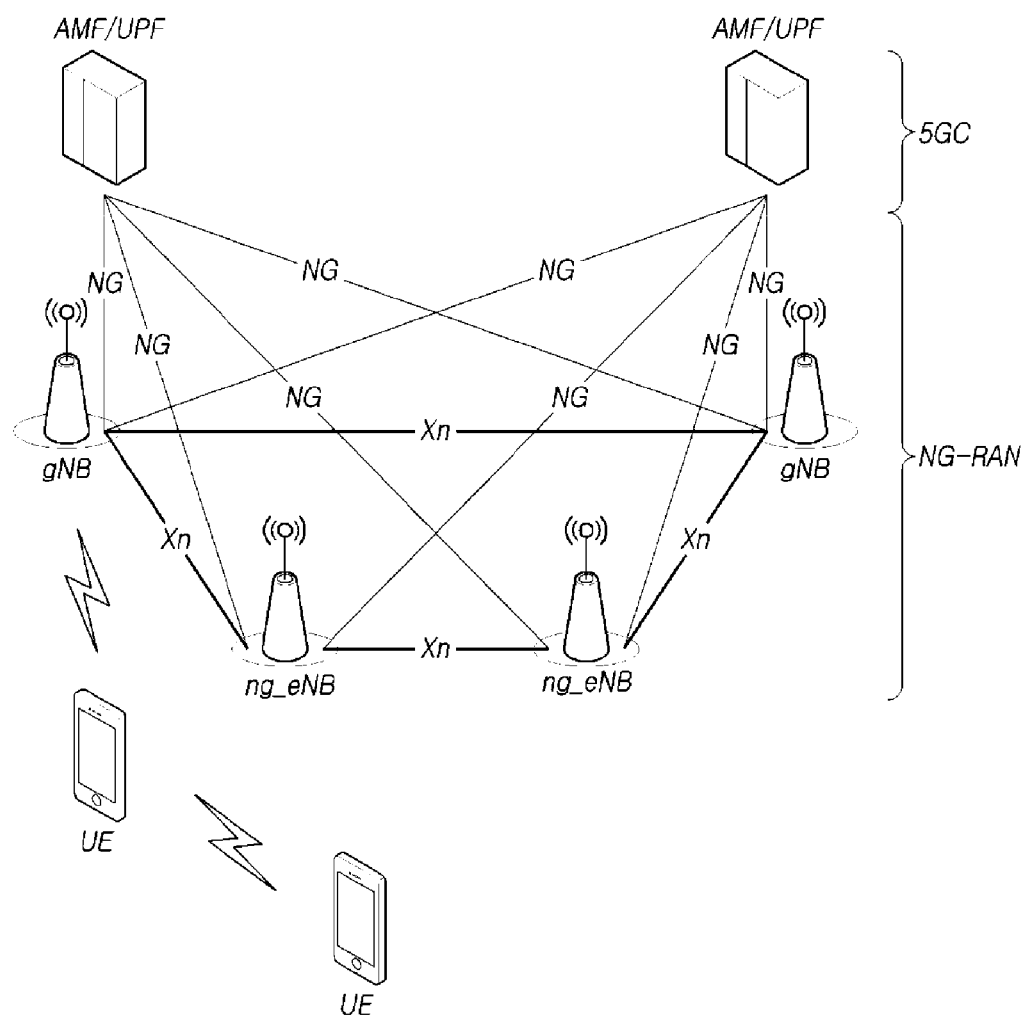
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic piefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
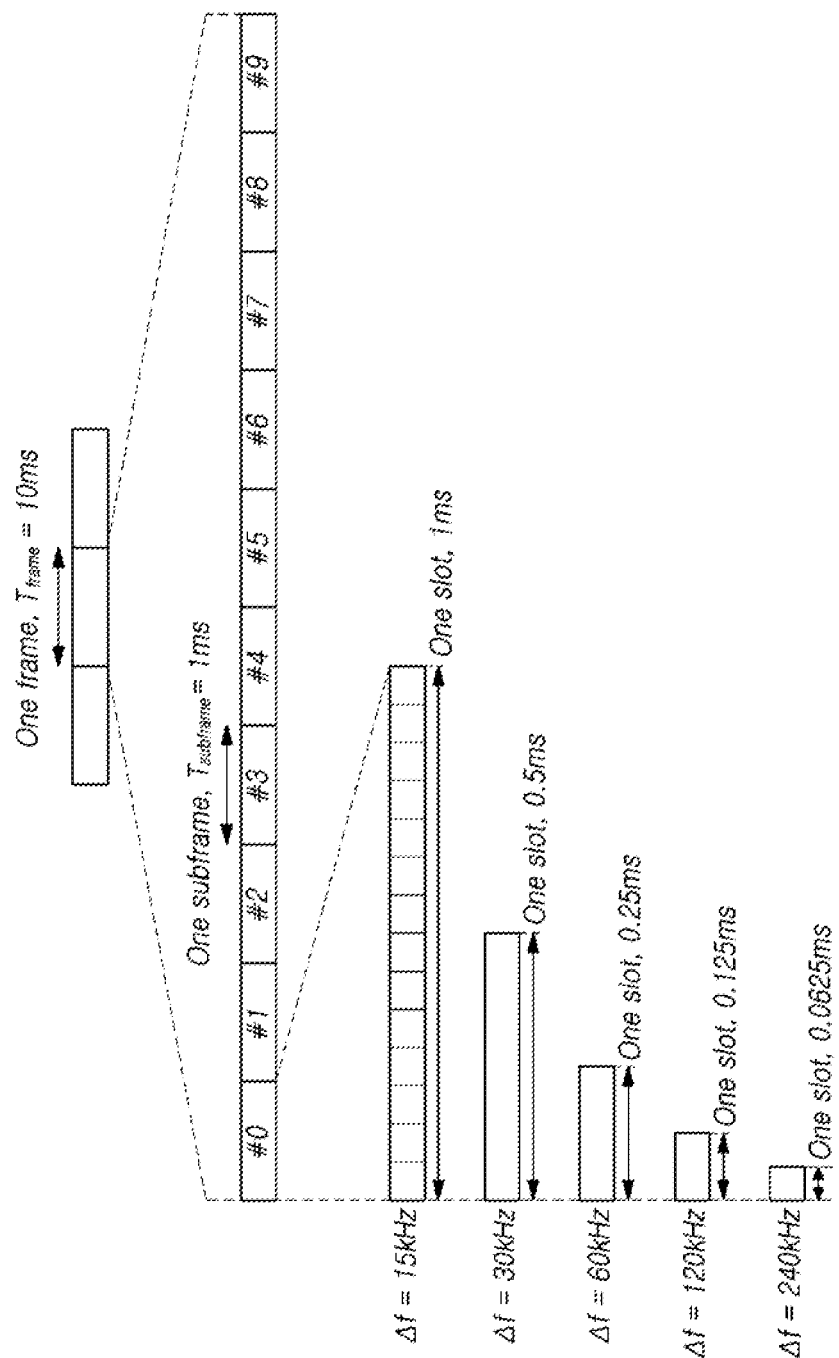
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
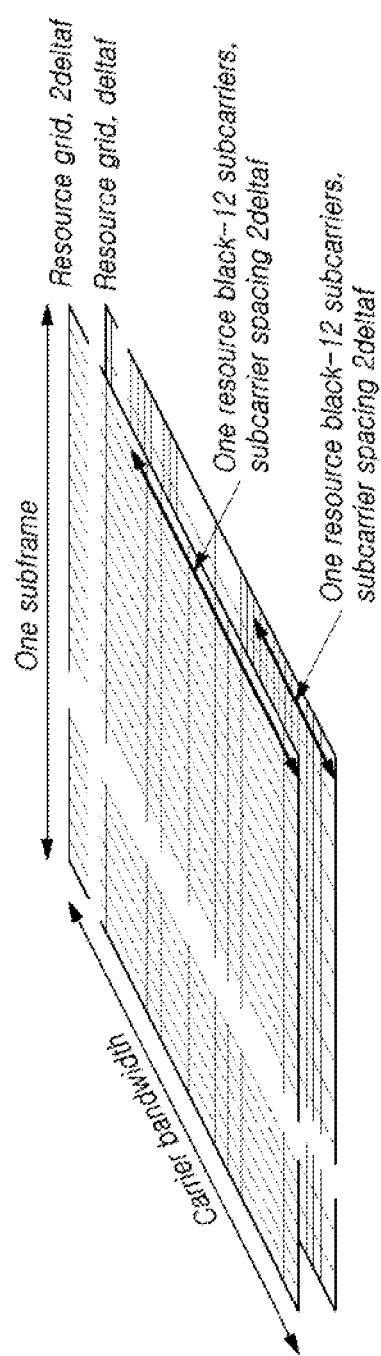
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
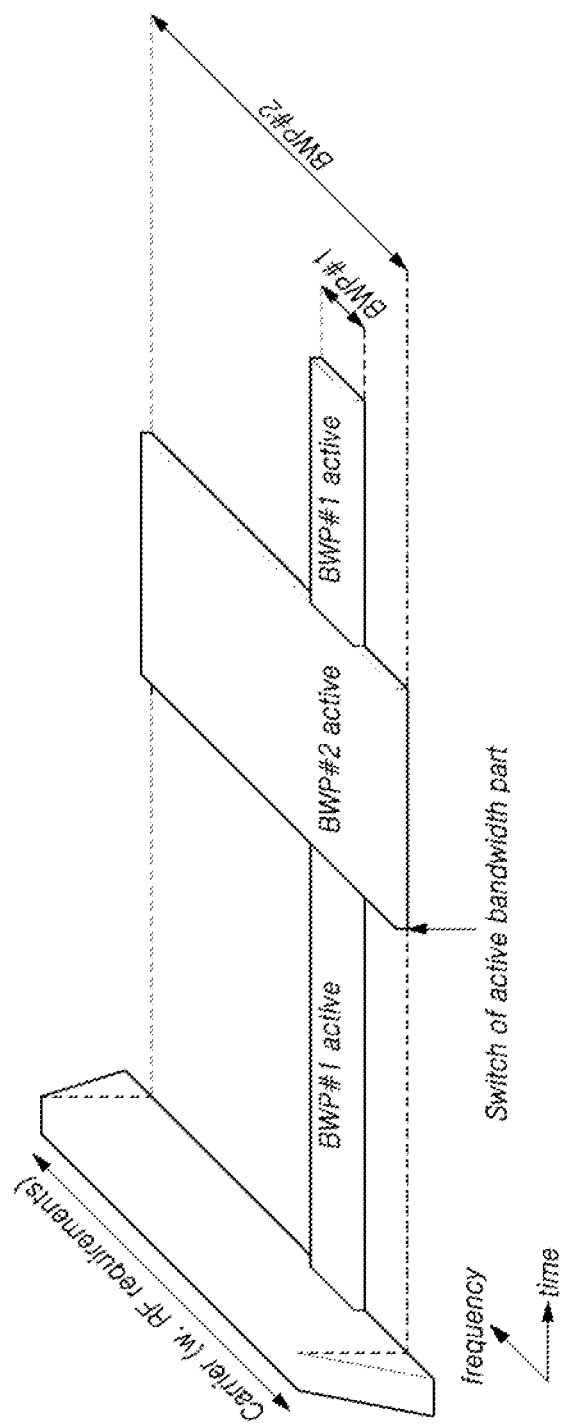
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
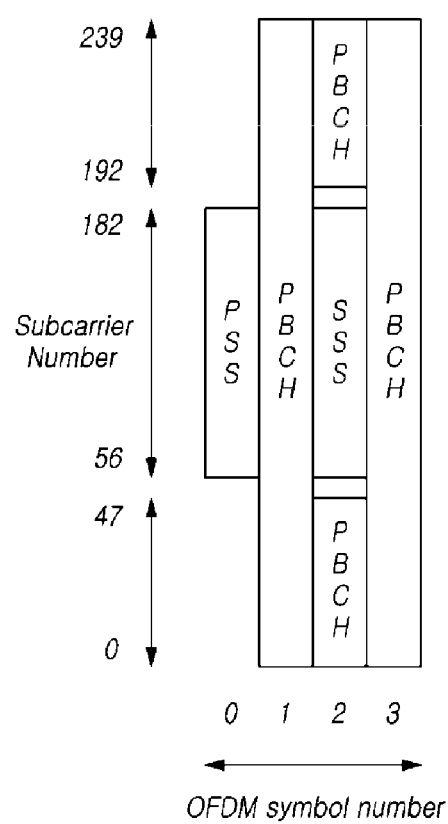
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
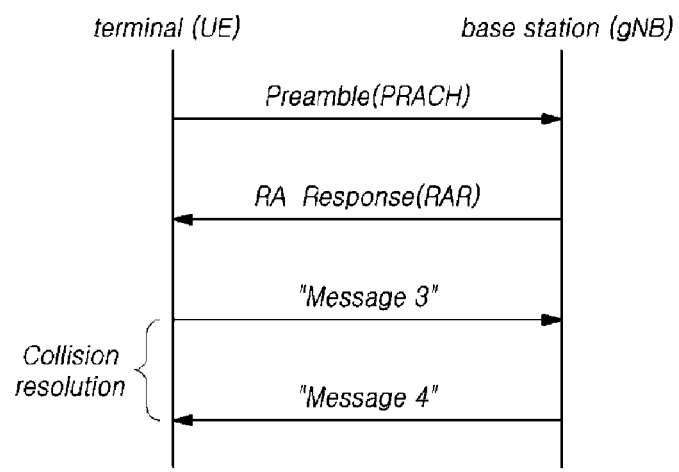
FIG. 6 is a signal diagram for explaining a random access procedure in a radio access technology in accordance with embodiments of the present disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
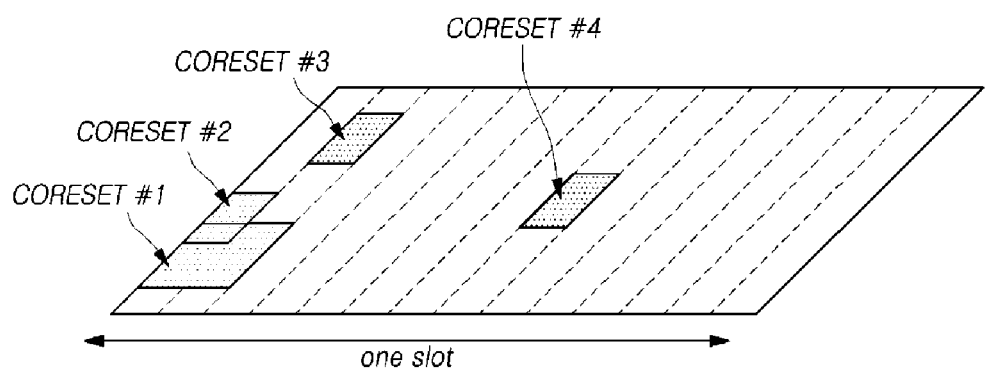
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of NR In order to meet requirements for each usage scenario, it is required to design NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, a subframe is defined as one type of a time domain structure in NR In addition, as a reference numerology to define a corresponding subframe duration, a single subframe duration is to defined as having 14 OFDM symbols of normal CP overhead based on 15 kHz subcarrier spacing (SCS), like the LTE. Therefore, the subframe of NR has the time duration of 1 ms.

Unlike LTE, since the subframe of NR is an absolute reference time duration, a slot and a mini-slot may be defined as a time unit for actual UL/DL data scheduling. In this case, the number of OFDM symbols which constitutes a slot, a value of y, is defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot is defined to be made up of fewer symbols than the slot in a numerology (or SCS). As a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, it is difficult to satisfy latency requirements. To this end, a mini-slot is defined. The mini-slot is made up of fewer OFDM symbols than the slot. Thus, the scheduling for the latency critical data, such as the URLLC, may be performed based on the mini-slot.

Figure 8:
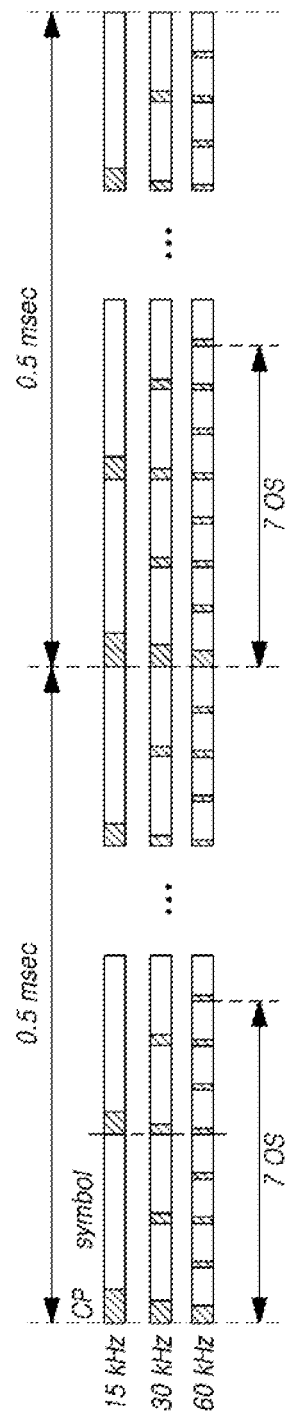
FIG. 8 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

As described above, different SCSs or different TTI lengths from one another are defined in NR. Accordingly, much discussion has been made over a method for satisfying requirements of each of the URLLC and the eMBB.

<Wider Bandwidth Operations>

The typical LTE system supports scalable bandwidth operations for LTE CC (component carrier). That is, according to a frequency deployment scenario, an LTE provider may configure a bandwidth of a minimum of 1.4 MHz to a maximum of 20 MHz in configuring a single LTE CC, and a typical LTE UE supports a transmission/reception capability of a bandwidth of 20 MHz for a single LTE CC.

Figure 9:
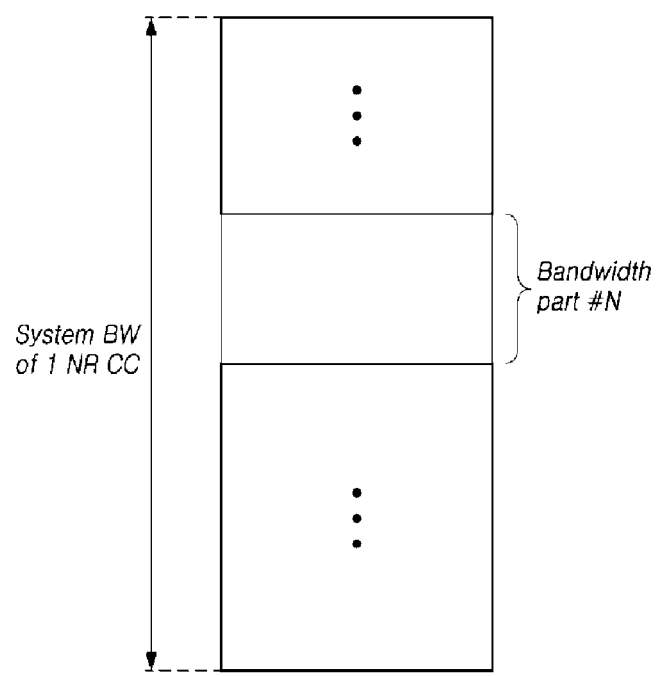
FIG. 9 is a view schematically illustrating a bandwidth part.

However, NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

As described above, an NR CC may be composed of one or more BWPs. When BWPs are configured in an NR CC, the BWPs may be configured to be UE-specific or cell-specific.

When a BWP configuration is set for an NR CC, UL/DL BWPs for communication between a UE and a BS may be set by activating a DL BWP for transmitting and receiving a PDCCH/PDSCH between the BS and the UE and activating a UL BWP for transmitting and receiving a PUCCH/PUSCH among the configured BWPs.

In accordance with an embodiment of the present disclosure, a frequency hopping method may be provided for a case in which BWPs have different sizes.

Specifically, in NR, two types of PUCCHs are defined for a UE to transmit UCI. A first type is a short duration PUCCH which is transmitted through one or two symbols in one slot, and a second type is a long duration PUCCH which is transmitted through four to 14 symbols. The short duration PUCCH may also be referred to below as a short PUCCH, and the long duration PUCCH may also be referred to below as a long PUCCH.

When a UE uses a short duration PUCCH composed of two symbols or a long duration PUCCH in one slot to transmit UCI, it is necessary to apply frequency hopping to obtain frequency diversity gain.

In particular, in the case of a short duration PUCCH composed of two symbols, frequency hopping may be performed in units of symbols. Also, in the case of a long duration PUCCH, frequency hopping may be supported at most once in one slot.

According to NR, when frequency hopping is supported for a PUCCH in a single slot as described above, it is necessary to define a detailed frequency hopping method for a corresponding PUCCH so that a UE transmits UCI through a short duration PUCCH composed of two symbols or a long duration PUCCH.

Specifically, as NR supports UE bandwidth adaption, UEs having different transmission/reception bandwidths in an NR CC are supported. Therefore, as described above, BWPs for PUCCH transmission and reception may be separately configured and activated for each UE. Accordingly, it is difficult to use the same single frequency hopping rule, which depends on a system bandwidth of a corresponding CC, unlike LTE.

According to an embodiment of a detailed frequency hopping method, different frequency hopping rules may be configured for a long duration PUCCH and a short duration PUCCH. Alternatively, different frequency hopping rules may be configured according to the number of symbols assigned for PUCCH transmission in a slot or UE.

In other words, a frequency hopping bandwidth for a PUCCH, which will be applied to a UE, may be configured as a function of a PUCCH duration or the number of symbols assigned for PUCCH transmission, a bandwidth of a BWP configured and activated for PUCCH transmission or a system bandwidth of an NR CC, and the like.

For example, in the case of a long duration PUCCH, a frequency hopping to bandwidth may be determined according to a system bandwidth of an NR CC with which a UE is connected regardless of a bandwidth of a BWP activated for the UE. In the case of a short duration PUCCH, a frequency hopping bandwidth may be determined according to a bandwidth of a BWP which is UE-specifically activated for UL transmission and reception.

Similarly, when the number of symbols of a PUCCH assigned for a UE in a slot is a specific value or more, a frequency hopping bandwidth may be determined according to a system bandwidth of an NR CC. Otherwise, a frequency hopping bandwidth may be determined according to a bandwidth of an activated BWP.

As a detailed example, it is possible to define a frequency hopping rule based on a system bandwidth of an NR CC (i.e., type-1 frequency hopping) and a frequency hopping rule based on a bandwidth of a BWP which is activated for each UE (i.e., type-2 frequency hopping) (however, the present disclosure is not limited to the names such as type-1 frequency hopping and type-2 frequency hopping). A frequency hopping rule which will be used for a UE to transmit UCI may be determined according to a duration of a PUCCH to be used for transmitting the UCI.

In other words, type-1 frequency hopping may be applied to a long duration PUCCH, and type-2 frequency hopping may be applied to a short duration PUCCH. Or, a frequency hopping type may be determined according to the number of symbols assigned for PUCCH transmission.

However, when the frequency hopping rule based on a system bandwidth (i.e., type-1 frequency hopping) is applied and a corresponding hopping bandwidth is greater than a transmission/reception bandwidth of a UE, a returning gap may be defined between frequency hops of a PUCCH. Alternatively, a BS/network may set and indicate a frequency hopping type for PUCCH transmission for each UE through UE-specific/cell-specific higher layer signaling, media access control (MAC) control element (CE) signaling, or to level-1 (L1) control signaling.

As another embodiment, a BS/network may set/indicate a frequency hopping bandwidth for a PUCCH for each UE. As a detailed method, a BS/network may directly set and signal a frequency hopping bandwidth for a PUCCH for each UE through UE-specific/cell-specific higher layer signaling.

Additionally, before frequency hopping configuration for a corresponding PUCCH, it is possible to define a default frequency hopping bandwidth or a default frequency hopping rule which will be applied to a UE. The default frequency hopping bandwidth or the default frequency hopping rule may be determined according to a bandwidth of a BWP or a bandwidth of an NR CC.

However, when a PUCCH hopping bandwidth is set through UE-specific/cell-specific higher layer signaling, the same hopping bandwidth may be set regardless of PUCCH duration, UCI type (e.g., scheduling request (SR), channel state indicator (CSI) feedback, or hybrid automatic request (HARQ) acknowledgement (ACK)/negative acknowledgement (NACK) feedback), payload size, or the like.

Alternatively, as described above, a frequency hopping bandwidth may be configured differently according to a PUCCH duration, the number of symbols assigned for PUCCH transmission in a slot, or a PUCCH format dependent on a UCI type, a payload size, or the like.

For another method for a base station (BS)/network to set/indicate a frequency hopping bandwidth for a PUCCH for each UE, a BS/network may indicate frequency hopping bandwidths, which will be applied to respective PUCCH transmission operations, through L1 control signaling. Specifically, when a UE indicates PUCCH transmission for HARQ ACK/NACK feedback or CSI feedback through downlink control information (DCI), such as DL assignment DCI or UL grant, for the UE, frequency hopping bandwidth indication information may be directly transmitted through the corresponding DCI together with PUCCH transmission resource allocation information.

However, as a method for reducing control overhead, it is possible to define candidate values which may be indicated by the BS/network through the PUCCH frequency hopping bandwidth indication information of the DCI, and indicate one of the candidate values through the DCI.

Here, the candidate values for PUCCH frequency hopping may be defined according to a bandwidth of a BWP or a system bandwidth of an NR CC, or the candidate value for PUCCH frequency hopping may be set by the BS/network through cell-specific/UE-specific higher layer signaling.

Alternatively, a default frequency hopping bandwidth or a default frequency hopping rule may be defined, and the BS/network may dynamically indicate an offset value (e.g., a physical resource block (PRB) offset value) from a frequency location of a second hop of a corresponding PUCCH (i.e., a PRB of the second hop of the corresponding PUCCH), to which the default frequency hopping bandwidth or the default frequency hopping rule has been applied, through L1 control signaling of corresponding DL assignment DCI or UL grant.

Alternatively, the BS/network may set a corresponding offset value through UE-specific/group common/cell-specific higher layer signaling or MAC CE signaling.

For example, type-2 frequency hopping dependent on a bandwidth of a BWP configured and activated for each UE, which is one of the methods described in Embodiment 1, may be defined as a default frequency hopping rule for any UE to transmit a PUCCH, and the BS/network may indicate a frequency hopping offset value from a second frequency hop of the corresponding PUCCH conforming to the default frequency hopping rule through L1 control signaling.

However, this embodiment may be applied regardless of a detailed default frequency hopping rule. For example, a default frequency hopping bandwidth may be semi-statically set for each UE through cell-specific/UE-specific higher layer signaling, type-2 frequency hopping of Embodiment 1 described above may be defined as a default hopping rule, or different default hopping rules may be defined according to a PUCCH duration or the number of PUCCH symbols as described in Embodiment 1.

Also, candidate values for corresponding hopping offset values which may be indicated by DCI to reduce control overhead may be defined in the same way as the above-described method of indicating a frequency hopping bandwidth through L1 control signaling.

As another embodiment, when frequency hopping for a PUCCH is applied in a slot or between slots, a BS/network may configure separate frequency resource allocation information (e.g., PRB allocation information) for each frequency hop and directly set/indicate the frequency resource allocation information for a UE.

For example, when a UE sets/indicates PUCCH transmission through one UL slot and frequency hopping is applied to the PUCCH transmission, frequency resource allocation information (e.g. PRB allocation information) for a first frequency hop of a corresponding PUCCH and frequency resource allocation information (e.g. PRB allocation information) for a second frequency hop of the corresponding PUCCH may be separately set and signaled to the corresponding UE.

In other words, a method for a BS/network to signal frequency resource allocation information (e.g., PRB allocation information) for PUCCH transmission of a UE may be defined to separately set frequency resource allocation information (e.g. PRB allocation information) for a first frequency hop of the corresponding PUCCH transmission and frequency resource allocation information (e.g. PRB allocation information) for a second frequency hop of the corresponding PUCCH transmission and to transmit the same to the corresponding UE through UE-specific/group common/cell-specific higher layer signaling, MAC CE signaling, or L1 control signaling.

Additionally, a BS/network may enable or disable frequency hopping for a PUCCH through cell-specific/UE-specific higher layer signaling, MAC CE signaling, or L1 control signaling.

Also, the scope of the present disclosure encompasses a frequency hopping method for a PUCCH defined to be a combination of the above-described frequency hopping methods. The frequency hopping methods described in the present disclosure may be applied not only to a PUCCH but also to all UL physical channels/signals, such as a PUSCH, a sounding reference signal (SRS), a physical random access channel (PRACH), etc., without departing from the scope of the present disclosure.

As a frequency band used in the wireless communication system goes to a high frequency band, a penetration loss of a radio signal increases, so that the coverage of the wireless communication system is reduced.

In the case of the NR system, a service is provided through the high frequency band compared to the LTE system. In particular, in order to increase data transmission speed, a system design is made targeting radio transmission and reception using the high frequency band such as 28 GHz that can secure a wider frequency bandwidth and a NR service is about to be commercialized through the corresponding high frequency band. However, due to the use of such a high frequency band, the coverage of the NR cell may be inferior to that of the LTE cell. In particular, the uplink transmission coverage of the UE, which has a limit of transmission power, is worse than the downlink transmission coverage of the base station.

The present disclosure provides a method for improving the uplink coverage of the UE in the NR system, in particular, the transmission coverage of PUSCH and PUCCH, which are uplink radio data channels and radio control channels. Specifically, as a method for improving the accuracy of uplink channel estimation of the UE in a base station, a method may be provided for DM-RS bundling for bundling a DM-RS included in one or more PUSCH transmissions or PUCCH transmissions transmitted from any UE to perform channel estimation.

Hereinafter, a method of performing uplink transmission/reception will be described in detail with reference to related drawings.

Figure 10:
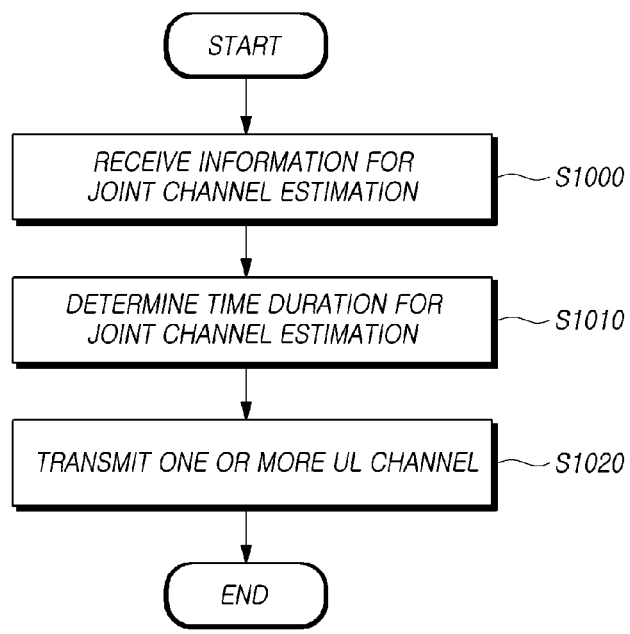
FIG. 10 is a flowchart showing a method of a user equipment for preforming an initial access according to an embodiment.

FIG. 10 is a flowchart illustrating a method of a user equipment (UE) for preforming a UL transmission according to an embodiment of the present disclosure.

Referring to FIG. 10, a user equipment (UE) performs uplink (UL) transmission. In order to perform uplink (UL) transmission, the UE may receive information on joint channel estimation at S1000.

When channel estimation for uplink channels such as PUCCH and PUSCH transmitted from the UE is performed, it may be configured to jointly perform channel estimation on one or more uplink channels. When DM-RSs are used for uplink channel estimation, the DM-RSs respectively included in one or more uplink channels may be bundled and used for the joint channel estimation.

The information for the joint channel estimation may include various configuration information required to perform the joint channel estimation. According to an example, the information for the joint channel estimation may include information on whether to perform the joint channel estimation.

The information on the joint channel estimation is transmitted through at least one of a higher layer signaling, a MAC (Medium Access Control) signaling and a physical layer signaling. That is, the joint channel estimation through DM-RS bundling for uplink transmission may be configured by the base station through Radio Resource Control (RRC) signaling, activated/deactivated through MAC CE (Medium Access Control Control Element) signaling or indicated through the DCI. The joint channel estimation may be configured thorough their combination.

Also, the information for joint channel estimation may include information on a time domain window, which is the time duration for the joint channel estimation. Specifically, information for the joint channel estimation may further include at least one of starting offset information at which DM-RS bundling starts, DM-RS bundling size configuration information, maximum DM-RS bundling size configuration information, or DM-RS bundling period configuration information and the like.

Referring back to FIG. 10, the UE may determine the time duration for the joint channel estimation based on the information on the joint channel estimation at S1010.

The UE may identify the time duration for performing the joint channel estimation based on the information for the joint channel estimation received from the base station. The time duration for the joint channel estimation may be configured to any one of a resource unit for radio resource allocation such as a repetition transmission unit, a slot, or a symbol configured for one or more uplink channels. In other words, the time duration for the joint channel estimation is configured to one of a repetition transmission unit, a slot unit and a symbol unit configured for the one or more UL channel and the information on the joint channel estimation is received through one of a RRC signaling and downlink (DL) control information.

For example, the DM-RS bundling size or the maximum DM-RS bundling size information may be configured or indicated in units of repetitions configured for the PUSCH or the PUCCH. Alternatively, the DM-RS bundling period information may be configured or indicated based on a resource unit for radio resource allocation on the time axis.

According to an embodiment, the UE may identify the time duration for performing the joint channel estimation configured or indicated by either RRC signaling or downlink control information based on the DM-RS bundling start offset information, the DM-RS bundling size configuration information, the maximum DM-RS bundling size configuration information, the DM-RS bundling information or the period configuration information, etc., included in the information for joint channel estimation.

According to an embodiment, the time duration for the joint channel estimation is separately configured based on one of a UL repetition transmission configuration and a multi-slot scheduling. For example, the DM-RS bundling for the corresponding joint channel estimation may be configured or indicated only when the repetition transmission for the PUSCH or the PUCCH transmission is applied. In this case, the DM-RS bundling period is set in units of the repetition transmission period. Therefore, the joint channel estimation may be performed for uplink channels repeatedly transmitted within one or more repetition transmission periods.

According to an embodiment, the time duration for the joint channel estimation is configured to have the same size as a frequency hopping interval applied to a UL transmission. For example, when the repetition transmission and the frequency hopping are configured for the uplink channel transmission, the corresponding frequency hopping may be configured to be the same as the DM-RS bundling size or period or to be performed in the same unit. Accordingly, the frequency hopping is not applied to uplink channel transmission within one DM-RS bundling size or period.

Referring back to FIG. 10, the UE may transmit one or more UL channel within the time duration for the joint channel estimation in order to maintain at least one of power consistency and phase continuity among transmissions of the one or more UL channel at S1020.

The UE may transmit one or more uplink channels to the base station by the bundling DM-RS within the determined time duration for the joint channel estimation. In this case, the UE may transmit one or more uplink channels to maintain power consistency. For example, the UE may determine the transmission power so that the transmission power for the uplink channel is maintained the same within one DM-RS bundling size or period. Alternatively, the UE may determine the transmission power so that the transmission power for the uplink channel is linearly gradually increased or decreased.

In addition, the UE may transmit one or more uplink channels to maintain the phase continuity. For example, the UE may determine that the phase applied to the DM-RS included in the uplink channel is continuously applied within one DM-RS bundling size or period. Accordingly, the phase of the DM-RS included in one DM-RS bundling size or period may have a continuously changed value.

The base station may perform estimation of the uplink channel by measuring one or more uplink channels from the UE together for each time duration for the joint channel estimation.

Therefore, according to the embodiment described above, the accuracy of uplink channel estimation is improved through the joint channel estimation.

Figure 11:
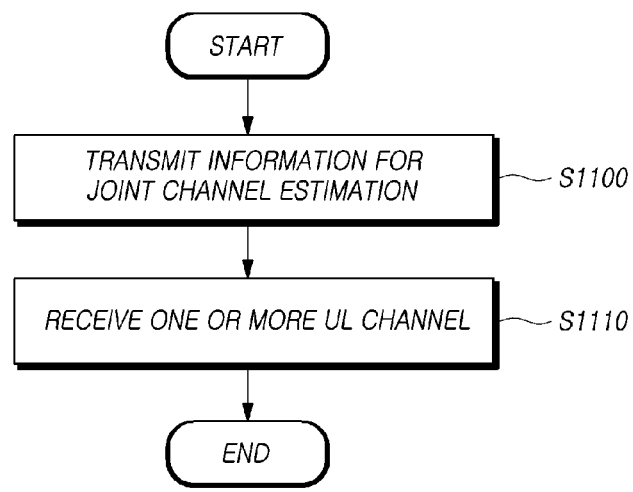
FIG. 11 is a flowchart showing a method of a base station for preforming an initial access according to an embodiment.

FIG. 11 is a flowchart illustrating a method of a base station for performing an uplink (UL) reception according to an embodiment of the present disclosure.

Referring to FIG. 11, a base station according to an embodiment of the present disclosure performs an uplink (UL) reception. The base station may transmit information on joint channel estimation including information on a time duration for the joint channel estimation at S1100.

For channel estimation for uplink channels such as PUCCH and PUSCH transmitted from the UE, the base station may be configured to jointly perform channel estimation on one or more uplink channels. When DM-RSs are used for uplink channel estimation, the DM-RSs respectively included in one or more uplink channels may be bundled and used for the joint channel estimation.

The information for the joint channel estimation may include various configuration information required to perform the joint channel estimation. According to an embodiment, the information for the joint channel estimation may include information on whether to perform the joint channel estimation.

The information on the joint channel estimation is received through at least one of a higher layer signaling, a MAC (Medium Access Control) signaling and a physical layer signaling. That is, the base station may configure the joint channel estimation through DM-RS bundling for uplink transmission through Radio Resource Control (RRC) signaling, activate/deactivate it through MAC CE (Medium Access Control Control Element) signaling or indicate it through the DCI. The joint channel estimation may be configured thorough their combination.

Also, the information for joint channel estimation may include information on a time domain window, which is the time duration for the joint channel estimation. Specifically, information for the joint channel estimation may further include at least one of starting offset information at which DM-RS bundling starts, DM-RS bundling size configuration information, maximum DM-RS bundling size configuration information, or DM-RS bundling period configuration information and the like.

Referring back to FIG. 11, the base station may receive one or more UL channel within the time duration for the joint channel estimation in order to maintain at least one of power consistency and phase continuity among transmissions of the one or more UL channel at S1110.

The UE may determine the time duration for performing the joint channel estimation based on the information for the joint channel estimation which the base station transmits. The UE may identify the time duration for performing the joint channel estimation based on the information for the joint channel estimation received from the base station. The time duration for the joint channel estimation may be configured to any one of a resource unit for radio resource allocation such as a repetition transmission unit, a slot, or a symbol configured for one or more uplink channels. In other words, the time duration for the joint channel estimation is configured to one of a repetition transmission unit, a slot unit and a symbol unit configured for the one or more UL channel and the information on the joint channel estimation is received through one of a RRC signaling and downlink (DL) control information.

For example, the DM-RS bundling size or the maximum DM-RS bundling size information may be configured or indicated in units of repetitions configured for the PUSCH or the PUCCH. Alternatively, the DM-RS bundling period information may be configured or indicated based on a resource unit for radio resource allocation on the time axis.

According to an embodiment, the UE may identify the time duration for performing the joint channel estimation configured or indicated by either RRC signaling or downlink control information based on the DM-RS bundling start offset information, the DM-RS bundling size configuration information, the maximum DM-RS bundling size configuration information, the DM-RS bundling information or the period configuration information, etc., included in the information for joint channel estimation.

According to an embodiment, the time duration for the joint channel estimation is separately configured based on one of a UL repetition transmission configuration and a multi-slot scheduling. For example, the DM-RS bundling for the corresponding joint channel estimation may be configured or indicated only when the repetition transmission for the PUSCH or the PUCCH transmission is applied. In this case, the DM-RS bundling period is set in units of the repetition transmission period. Therefore, the joint channel estimation may be performed for uplink channels repeatedly transmitted within one or more repetition transmission periods.

According to an embodiment, the time duration for the joint channel estimation is configured to have the same size as a frequency hopping interval applied to a UL transmission. For example, when the repetition transmission and the frequency hopping are configured for the uplink channel transmission, the corresponding frequency hopping may be configured to be the same as the DM-RS bundling size or period or to be performed in the same unit. Accordingly, the frequency hopping is not applied to uplink channel transmission within one DM-RS bundling size or period.

The base station may receive one or more UL channel one or more uplink channels to the base station by the bundling DM-RS within the determined time duration for the joint channel estimation. In this case, the UE may transmit one or more uplink channels to maintain power consistency. For example, the UE may determine the transmission power so that the transmission power for the uplink channel is maintained the same within one DM-RS bundling size or period. Alternatively, the UE may determine the transmission power so that the transmission power for the uplink channel is linearly gradually increased or decreased.

In addition, the base station may receive one or more uplink channels to maintain the phase continuity. For example, the UE may determine that the phase applied to the DM-RS included in the uplink channel is continuously applied within one DM-RS bundling size or period. Accordingly, the phase of the DM-RS included in one DM-RS bundling size or period may have a continuously changed value.

The base station may perform estimation of the uplink channel by measuring one or more uplink channels from the UE together for each time duration for the joint channel estimation.

Therefore, according to the embodiment described above, the accuracy of uplink channel estimation is improved through the joint channel estimation.

Hereinafter, embodiments of a method for performing uplink transmission/reception in NR will be described in detail with reference to related drawings. The embodiments described below may be applied individually or in any combination.

In order to improve the channel estimation performance for the wireless uplink channel of the UE, the BE may perform channel estimation for the uplink of the corresponding UE by bundling the DM-RSs for one or more uplink channel transmissions. That is, the UE may perform coherent transmission in which phase continuity between DM-RSs included in different PUSCH or PUCCH transmissions is maintained. In this case, the base station may improve the channel estimation performance by performing channel estimation based on the DM-RS included in one or more PUSCH or PUCCH transmissions on which the corresponding DM-RS bundling is performed. Similarly, in the case of downlink, downlink channel estimation performance may be improved through DM-RS bundling between PDDCHs or PDSCHs transmitted through a plurality of TTIs.

Hereinafter, DM-RS bundling methods for improving the channel estimation performance of the base station for the uplink of the UE will be described. Such DM-RS bundling methods may be substantially equally applied to downlink transmission of the base station.

The DM-RS bundling for uplink transmission of a UE may be configured by the base station through RRC (Radio Resource Control) signaling, activated/deactivated (activation/deactivation) through MAC CE (Medium Access Control Control Element) signaling, or indicated through the DCI.

The time duration information for joint channel estimation may be explicitly configured or implicitly derived. According to an embodiment, DM-RS bundling configuration information transmitted through the RRC signaling may further include at least one of starting offset information at which DM-RS bundling starts, DM-RS bundling size configuration information, maximum DM-RS bundling size configuration information, and DM-RS bundling period configuration information, etc. According to another embodiment, the bundling indication information indicated through the DCI may further include the starting offset information at which DM-RS bundling starts, the DM-RS bundling size information, or the maximum DM-RS bundling period information.

In this case, the corresponding DM-RS bundling size information or the maximum DM-RS bundling size information may be configured or indicated in units of nominal PUSCH or PUCCH transmission or PUSCH or PUCCH transmission repetition. Alternatively, DM-RS bundling period information may be configured or indicated based on a resource unit for radio resource allocation in the time axis or domain, such as a symbol, a slot, or a frame.

In addition, it may configure one or more bundling sizes through the RRC signaling and indicate a bundling size for a corresponding scheduled PUSCH or PUCCH transmission through the DCI. Alternatively, it may configure a bundling period through the RRC signaling, indicate a starting offset through the DCI, or directly indicate a bundling period through the DCI. However, when the bundling period is configured or indicated based on a resource unit for radio resource allocation on the time axis, such as a symbol, a slot or a frame, the corresponding configuration value may be configured and interpreted for an unavailable period for uplink transmission (e.g., a DL symbol, a DL slot, etc.), or may be configured and interpreted only for a UL slot or UL symbol configured for uplink transmission.

According to an embodiment, the DM-RS bundling may be configured or indicated only when repetition for PUSCH or PUCCH transmission is applied. In this case, frequency hopping is not applied to PUSCH or PUCCH transmission belonging to one DM-RS bundling size or DM-RS bundling period. That is, if the repetition for PUSCH or PUCCH transmission is applied in a UE and intra-slot or inter-slot frequency hopping is configured, the corresponding frequency hopping may be made in units of DM-RS bundling size or period.

According to another embodiment, the DM-RS bundling may be configured or indicated regardless of whether the repetition is applied to any PUSCH or PUCCH transmission. In this case, the corresponding DM-RS bundling may be applied only when resource blocks (RBs) allocated between consecutive PUSCH transmissions or between consecutive PUCCH transmissions within the configured or indicated DM-RS bundling size or DM-RS bundling period are equal to each other. The same RB allocation may include only a full overlap case. Or, the same RB allocation may include both a fully overlap case and a partially overlap case.

Embodiment 1: Scheduled PUSCH/PUCCH Transmission without Repetition & Multi-Slot Scheduling When the DM-RS bundling is applied to DG (Dynamic Grant)-based PUSCH or PUCCH transmission to which the repetition is not applied, the DCI including resource allocation information for the PUSCH or the PUCCH transmission resources may include DM-RS bundling indication information. According to an embodiment, the corresponding bundling indication information may be indicated in the form of toggling for the previous PUSCH or PUCCH transmission. That is, whether to apply the DM-RS bundling with the DM-RS included in the previous PUSCH/PUCCH transmission may be determined according to whether to be toggling.

Alternatively, the DM-RS bundling size information together with the DM-RS bundling indication information may be indicated through the DCI or configured through the RRC signaling. Accordingly, the UE may perform the DM-RS transmission for the DM-RS bundling in the corresponding time duration according to DM-RS bundling size information configured or indicated for the scheduled PUSCH or PUCCH transmission.

However, when the DM-RS bundling for the corresponding UE is configured or indicated, the DM-RS bundling may be applied only when the corresponding PUSCH or PUCCH transmission is performed through the same RB(s) between TTIs (e.g., a slot or a mini-slot) in which the corresponding PUSCH or PUCCH transmission is performed Alternatively, it may be defined that the DM-RS bundling is not applied to the DG-based transmission to which the repetition is not applied.

Embodiment 2: Scheduled PUSCH/PUCCH Transmission with Repetition or Multi-Slot Scheduling When the repetition for PUSCH or PUCCH transmission is configured or indicated, the DM-RS bundling for the corresponding PUSCH or PUCCH repetition may be configured or indicated.

Specifically, when the number of repetitions for the PUSCH or PUCCH is configured to the RRC signaling, the corresponding DM-RS bundling configuration and bundling size (or period) may also be configured through the RRC signaling. In addition, when the frequency hopping is additionally configured, the corresponding frequency hopping may also be performed in units of DM-RS bundling size (or period), as described above.

On the other hand, when the repetition for the PUSCH or PUCCH is indicated through the DCI, the DM-RS bundling indication information and the DM-RS bundling size (or period) information may also be transmitted through the DCI. In addition, when the frequency hopping is additionally configured, the corresponding frequency hopping may also be performed in units of DM-RS bundling size (or period), as described above.

Conversely, when the frequency hopping size is configured or indicated for PUSCH or PUCCH transmission, and frequency hopping is configured, whether the DM-RS bundling is applied within one frequency hop may be configured or indicated. For example, when the frequency hopping is configured and a separate frequency hopping size (i.e., TTI or slot size in which the frequency hopping is performed) is configured or indicated, whether the DM-RS bundling is additionally configured or indicated within one frequency hop may be configured or indicated. That is, the DM-RS bundling may be applied only within one frequency hop, and the DM-RS bundling size may be determined by configuring the size of one frequency hop.

Embodiment 3: Configured PUSCH/PUCCH Transmission

In the case of configured PUSCH transmission in which uplink resources are indicated by higher layer signaling rather than the DCI, the DM-RS bundling configuration may be performed through the RRC signaling. In this case, the bundling start offset, the bundling size (or period), etc. may also be configured through the RRC signaling.

Accordingly, the DM-RS bundling may be applied to the PUSCH transmission within the bundling size duration configuration for the CG-PUSCH transmission. If frequency hopping is additionally configured, the frequency hopping may also be defined to be performed in units of the DM-RS bundling size.

Conversely, when the frequency hopping size is configured or indicated for PUSCH or PUCCH transmission, and the frequency hopping is configured, whether DM-RS bundling is applied within one frequency hop may be configured or indicated. For example, when the frequency hopping is configured and a separate frequency hopping size (ie, TTI or slot size in which frequency hopping is performed) is configured or indicated, whether DM-RS bundling is additionally configured or indicated within one frequency hop may be configured or indicated. That is, the DM-RS bundling may be applied only within one frequency hop, and the DM-RS bundling size may be determined by configuring the size of one frequency hop.

In the above, a method for the DM-RS bundling for the uplink transmission of the UE has been described, but the same content may be applied to downlink transmission of the base station, which is within the scope of the technical spirit of the present disclosure.

Hereinafter, detailed description will be made with respect to the hardware structure of the UE and the base station being capable of implementing some or all of the embodiments as described with reference to FIGS. 1 to 11.

Figure 12:
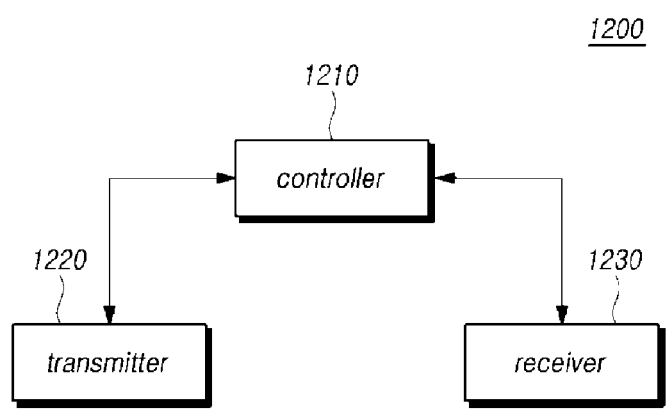
FIG. 12 is a block diagram showing a user equipment according to an embodiment.

FIG. 12 is a block diagram showing a UE 1200 according to an embodiment.

Referring now to FIG. 12, the UE 1200 according to the embodiment may include a controller 1210, a transmitter 1220, and a receiver 1230.

The controller 1210 may be a set of at least one processors and control the overall operation of the UE 1200 according to the method for performing an uplink (UL) transmission. The transmitter 1220 may be a circuitry and transmit uplink control information, data, and messages to a base station through a corresponding channel, and transmit sidelink control information, data, and messages to other UE through a corresponding channel. The receiver 1230 may be a circuitry and receive downlink control information, data, and messages from the base station through a corresponding channel, and receive sidelink control information, data, and messages from other UE through a corresponding channel.

The receiver 1230 is configured to receive information on joint channel estimation. The information for the joint channel estimation may include various configuration information required to perform the joint channel estimation. According to an example, the information for the joint channel estimation may include information on whether to perform the joint channel estimation.

The information on the joint channel estimation is received through at least one of a higher layer signaling, a MAC (Medium Access Control) signaling and a physical layer signaling. That is, the joint channel estimation through DM-RS bundling for uplink transmission may be configured by the base station through Radio Resource Control (RRC) signaling, activated/deactivated through MAC CE (Medium Access Control Control Element) signaling or indicated through the DCI. The joint channel estimation may be configured thorough their combination.

Also, the information for joint channel estimation may include information on a time domain window, which is the time duration for the joint channel estimation. Specifically, information for the joint channel estimation may further include at least one of starting offset information at which DM-RS bundling starts, DM-RS bundling size configuration information, maximum DM-RS bundling size configuration information, or DM-RS bundling period configuration information and the like.

The controller 1210 is configured to determine the time duration for the joint channel estimation based on the information on the joint channel estimation.

The controller 1210 may identify the time duration for performing the joint channel estimation based on the information for the joint channel estimation received from the base station. The time duration for the joint channel estimation may be configured to any one of a resource unit for radio resource allocation such as a repetition transmission unit, a slot, or a symbol configured for one or more uplink channels.

In other words, the time duration for the joint channel estimation is configured to one of a repetition transmission unit, a slot unit and a symbol unit configured for the one or more UL channel and the information on the joint channel estimation is received through one of a RRC signaling and downlink (DL) control information.

For example, the DM-RS bundling size or the maximum DM-RS bundling size information may be configured or indicated in units of repetitions configured for the PUSCH or the PUCCH. Alternatively, the DM-RS bundling period information may be configured or indicated based on a resource unit for radio resource allocation on the time axis.

According to an embodiment, the controller 1210 may identify the time duration for performing the joint channel estimation configured or indicated by either RRC signaling or downlink control information based on the DM-RS bundling start offset information, the DM-RS bundling size configuration information, the maximum DM-RS bundling size configuration information, the DM-RS bundling information or the period configuration information, etc., included in the information for joint channel estimation.

According to an embodiment, the time duration for the joint channel estimation is separately configured based on one of a UL repetition transmission configuration and a multi-slot scheduling. For example, the DM-RS bundling for the corresponding joint channel estimation may be configured or indicated only when the repetition transmission for the PUSCH or the PUCCH transmission is applied. In this case, the DM-RS bundling period is set in units of the repetition transmission period. Therefore, the joint channel estimation may be performed for uplink channels repeatedly transmitted within one or more repetition transmission periods.

According to an embodiment, the time duration for the joint channel estimation is configured to have the same size as a frequency hopping interval applied to a UL transmission. For example, when the repetition transmission and the frequency hopping are configured for the uplink channel transmission, the corresponding frequency hopping may be configured to be the same as the DM-RS bundling size or period or to be performed in the same unit. Accordingly, the frequency hopping is not applied to uplink channel transmission within one DM-RS bundling size or period.

The transmitter 1220 is configured to transmit one or more UL channel within the time duration for the joint channel estimation in order to maintain at least one of power consistency and phase continuity among transmissions of the one or more UL channel.

The transmitter 1220 may transmit one or more uplink channels to the base station by the bundling DM-RS within the determined time duration for the joint channel estimation. In this case, the transmitter 1220 may transmit one or more uplink channels to maintain power consistency. For example, the controller 1210 may determine the transmission power so that the transmission power for the uplink channel is maintained the same within one DM-RS bundling size or period. Alternatively, the controller 1210 may determine the transmission power so that the transmission power for the uplink channel is linearly gradually increased or decreased.

In addition, the transmitter 1220 may transmit one or more uplink channels to maintain the phase continuity. For example, the controller 1210 may determine that the phase applied to the DM-RS included in the uplink channel is continuously applied within one DM-RS bundling size or period. Accordingly, the phase of the DM-RS included in one DM-RS bundling size or period may have a continuously changed value.

According to the embodiment described above, the base station may perform estimation of the uplink channel by measuring one or more uplink channels from the UE together for each time duration for the joint channel estimation.

Therefore, the accuracy of uplink channel estimation is improved through the joint channel estimation.

Figure 13:
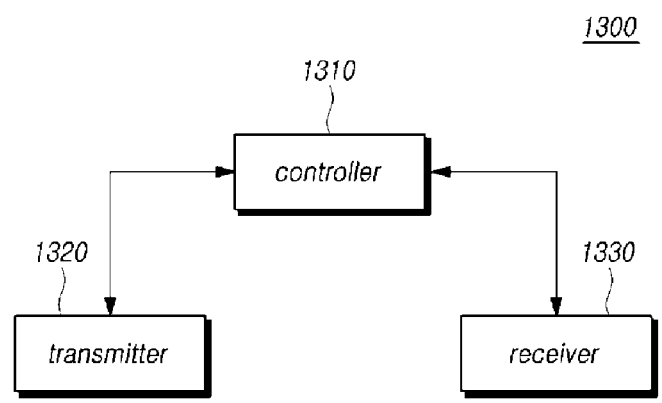
FIG. 13 is a block diagram showing a base station according to an embodiment.

FIG. 13 is a block diagram showing a base station 1300 according to an embodiment.

Referring now to FIG. 13, the base station 1300 according to the embodiment may include a controller 1310, a transmitter 1320, and a receiver 1330.

The controller 1310 may be a set of at least one processors and control the overall operation of the base station 1300 according to the above-described method required for the base station to perform an uplink (UL) transmission.

The transmitter 1320 is configured to transmit information on joint channel estimation comprising information on a time duration for the joint channel estimation The information for the joint channel estimation may include various configuration information required to perform the joint channel estimation. According to an embodiment, the information for the joint channel estimation may include information on whether to perform the joint channel estimation.

The information on the joint channel estimation is transmitted through at least one of a higher layer signaling, a MAC (Medium Access Control) signaling and a physical layer signaling. That is, the transmitter 1320 may configure the joint channel estimation through DM-RS bundling for uplink transmission through Radio Resource Control (RRC) signaling, activate/deactivate it through MAC CE (Medium Access Control Control Element) signaling or indicate it through the DCI. The joint channel estimation may be configured thorough their combination.

Also, the information for joint channel estimation may include information on a time domain window, which is the time duration for the joint channel estimation. Specifically, information for the joint channel estimation may further include at least one of starting offset information at which DM-RS bundling starts, DM-RS bundling size configuration information, maximum DM-RS bundling size configuration information, or DM-RS bundling period configuration information and the like.

The receiver 1330 is configured to receive one or more UL channel within the time duration for the joint channel estimation in order to maintain at least one of power consistency and phase continuity among transmissions of the one or more UL channel.

The UE may determine the time duration for performing the joint channel estimation based on the information for the joint channel estimation which the transmitter 1320 of the base station 1300 transmits. The UE may identify the time duration for performing the joint channel estimation based on the information for the joint channel estimation received from the base station. The time duration for the joint channel estimation may be configured to any one of a resource unit for radio resource allocation such as a repetition transmission unit, a slot, or a symbol configured for one or more uplink channels. In other words, the time duration for the joint channel estimation is configured to one of a repetition transmission unit, a slot unit and a symbol unit configured for the one or more UL channel and the information on the joint channel estimation is received through one of a RRC signaling and downlink (DL) control information.

For example, the DM-RS bundling size or the maximum DM-RS bundling size information may be configured or indicated in units of repetitions configured for the PUSCH or the PUCCH. Alternatively, the DM-RS bundling period information may be configured or indicated based on a resource unit for radio resource allocation on the time axis.

According to an embodiment, the UE may identify the time duration for performing the joint channel estimation configured or indicated by either RRC signaling or downlink control information based on the DM-RS bundling start offset information, the DM-RS bundling size configuration information, the maximum DM-RS bundling size configuration information, the DM-RS bundling information or the period configuration information, etc., included in the information for joint channel estimation.

According to an embodiment, the time duration for the joint channel estimation is separately configured based on one of a UL repetition transmission configuration and a multi-slot scheduling. For example, the DM-RS bundling for the corresponding joint channel estimation may be configured or indicated only when the repetition transmission for the PUSCH or the PUCCH transmission is applied. In this case, the DM-RS bundling period is set in units of the repetition transmission period. Therefore, the joint channel estimation may be performed for uplink channels repeatedly transmitted within one or more repetition transmission periods.

According to an embodiment, the time duration for the joint channel estimation is configured to have the same size as a frequency hopping interval applied to a UL transmission. For example, when the repetition transmission and the frequency hopping are configured for the uplink channel transmission, the corresponding frequency hopping may be configured to be the same as the DM-RS bundling size or period or to be performed in the same unit. Accordingly, the frequency hopping is not applied to uplink channel transmission within one DM-RS bundling size or period.

The receiver 1330 may receive one or more UL channel one or more uplink channels to the base station by the bundling DM-RS within the determined time duration for the joint channel estimation. In this case, the receiver 1330 may transmit one or more uplink channels to maintain power consistency. For example, the UE may determine the transmission power so that the transmission power for the uplink channel is maintained the same within one DM-RS bundling size or period. Alternatively, the UE may determine the transmission power so that the transmission power for the uplink channel is linearly gradually increased or decreased.

In addition, the receiver 1330 may receive one or more uplink channels to maintain the phase continuity. For example, the UE may determine that the phase applied to the DM-RS included in the uplink channel is continuously applied within one DM-RS bundling size or period. Accordingly, the phase of the DM-RS included in one DM-RS bundling size or period may have a continuously changed value.

The controller 1310 may perform estimation of the uplink channel by measuring one or more uplink channels from the UE together for each time duration for the joint channel estimation.

Therefore, according to the embodiment described above, the accuracy of uplink channel estimation is improved through the joint channel estimation.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a user equipment (UE) for performing an uplink (UL) transmission, the method comprising:
receiving information on joint channel estimation for jointly performing channel estimation on one or more uplink channels through bundling demodulate-reference signals (DM-RS) included in uplink transmissions;
determining a time duration for the joint channel estimation based on the information on the joint channel estimation; and
transmitting one or more UL channels within the time duration for the joint channel estimation,
wherein the information on the joint channel estimation includes maximum DM-RS bundling size configuration information.

2. The method of claim 1, wherein the information on the joint channel estimation is received through at least one of a higher layer signaling, a MAC (Medium Access Control) signaling, and a physical layer signaling.

3. The method of claim 1, wherein:
the time duration for the joint channel estimation is configured to one of a repetition transmission unit, a slot unit, and a symbol unit configured for the one or more UL channel; and
the information on the joint channel estimation is received through one of a RRC signaling and downlink (DL) control information.

4. The method of claim 1, wherein the time duration for the joint channel estimation is separately configured based on one of a UL repetition transmission configuration and a multi-slot scheduling.

5. The method of claim 1, wherein the time duration for the joint channel estimation is configured to have a same size as a frequency hopping interval applied to a UL transmission.

6. A method of a base station for performing an uplink (UL) reception, the method comprising:
transmitting information on joint channel estimation comprising information on a time duration for the joint channel estimation for jointly performing channel estimation on one or more uplink channels through bundling demodulate-reference signals (DM-RS) included in uplink transmissions; and
receiving one or more UL channels within the time duration for the joint channel estimation,
wherein the information on the joint channel estimation includes maximum DM-RS bundling size configuration information.

7. The method of claim 6, wherein the information on the joint channel estimation is transmitted through at least one of a higher layer signaling, a MAC (Medium Access Control) signaling, and a physical layer signaling.

8. The method of claim 6, wherein:
the time duration for the joint channel estimation is configured to one of a repetition transmission unit, a slot unit, and a symbol unit configured for the one or more UL channel; and
the information on the joint channel estimation is transmitted through one of a RRC signaling and downlink (DL) control information.

9. The method of claim 6, wherein the time duration for the joint channel estimation is separately configured based on one of a UL repetition transmission configuration and a multi-slot scheduling.

10. The method of claim 6, wherein the time duration for the joint channel estimation is configured to have the same size as a frequency hopping interval applied to a UL transmission.

11. A user equipment (UE) for performing an uplink (UL) transmission, the UE comprising:
a receiver configured to receive information on joint channel estimation for jointly performing channel estimation on one or more uplink channels through bundling demodulate-reference signals (DM-RS) included in uplink transmissions;

a controller configured to determine a time duration for the joint channel estimation based on the information on the joint channel estimation; and a transmitter configured to transmit one or more UL channels within the time duration for the joint channel estimation, wherein the information on the joint channel estimation includes maximum DM-RS bundling size configuration information.

12. The UE of claim 11, wherein the information on the joint channel estimation is received through at least one of a higher layer signaling, a MAC (Medium Access Control) signaling, and a physical layer signaling.

13. The UE of claim 11, wherein:

the time duration for the joint channel estimation is configured to one of a repetition transmission unit, a slot unit, and a symbol unit configured for the one or more UL channel; and the information on the joint channel estimation is received through one of a RRC signaling and downlink (DL) control information.

14. The UE of claim 11, wherein the time duration for the joint channel estimation is separately configured based on one of a UL repetition transmission configuration and a multi-slot scheduling.

15. The UE of claim 11, wherein the time duration for the joint channel estimation is configured to have the same size as a frequency hopping interval applied to a UL transmission.

* * * * *